B. D. HORTON.
FASTENING DEVICE FOR CONDUITS AND THE LIKE.
APPLICATION FILED FEB. 23, 1916.

1,310,190.

Patented July 15, 1919.

INVENTOR.

BY

ATTORNEY

UNITED STATES PATENT OFFICE.

BRYSON DEXTER HORTON, OF DETROIT, MICHIGAN.

FASTENING DEVICE FOR CONDUITS AND THE LIKE.

1,310,190.  Specification of Letters Patent.  Patented July 15, 1919.

Application filed February 23, 1916. Serial No. 79,861.

*To all whom it may concern:*

Be it known that I, BRYSON DEXTER HORTON, a citizen of the United States, residing in Detroit, in the county of Wayne and State of Michigan, have invented certain new and useful Improvements in Fastening Devices for Conduits and the like, of which the following is a description.

My present invention relates more particularly to new and improved means for mounting conduits in metal switch casings where the apertures or knockout openings are relatively larger in diameter than the diameter of the conduits. My invention consists in providing a pair of apertured washers or reducers, the openings in which are less in diameter than the knockout opening of the switch casing, these reducers being disposed upon opposite sides of the casing in position to be clamped firmly thereagainst by a binding nut and bushing mounted upon and in screw-threaded engagement with the end of the conduit.

In the accompanying drawing, I have illustrated a preferable embodiment of my invention, in which Figure 1 represents in plan view a conduit fastened to an apertured wall (part of which is shown) by means of my invention;

Heretofore it has been customary to provide the side walls of metallic switch cabinets or casings with knockouts of different diameters so as to accommodate the particular size of conduit which it might be desired to employ when making an installation. By the use of my improvement, but one size of knockout opening is necessary, this being preferably sufficiently large in diameter to accommodate the largest size conduit generally employed in connection with any particular cabinet. Assuming that one inch represents the maximum diameter of conduit which can be used with a particular cabinet provided with corresponding knockout openings I employ reducing plates having apertures of less diameter but corresponding to the diameter of the conduit which is to be run into said cabinet, as for instance if a three-quarter inch conduit is to be installed, I employ a pair of reducers having apertures just sufficiently large to take the three-quarter inch conduit so that the reducers will extend over and cover the space intervening between the circumferential edge of the casing and the conduit.

Figure 1:
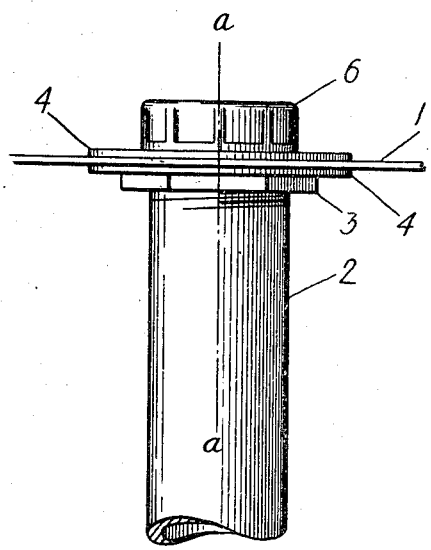
Figure 2:
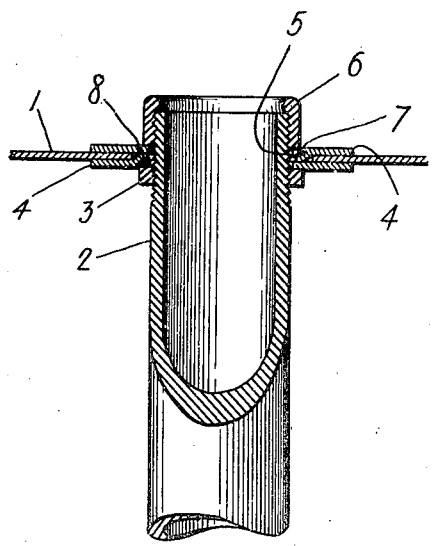
Fig. 2 is a vertical cross-sectional view, taken on line *a—a* of Fig. 1.

In Fig. 2 I have illustrated by way of example a fragmentary part of the wall 1 of a casing, the aperture through which may be assumed to be one inch in diameter and the conduit fastened therein three-quarters of an inch in diameter. Upon the threaded end of the conduit is mounted a hexagonal nut 3, next to which is positioned a reducer plate or washer 4 having a center aperture 5 sufficiently large to clear the threads thereon. After thus assembling the parts described, the threaded end of the conduit is projected into the casing through the aperture thereof, and another reducer plate 4 complemental to the one last mentioned is assembled upon the threaded end of the conduit, after which a galvanized iron bushing 6 is screwed upon the end of the conduit and brought into firm engagement with the adjacent reducer plate. By tightening the hexagonal nut 3 and the bushing 6, a firm and rigid assembly will be made, the side of the switch casing or housing 1 being firmly clamped between the reducers 4. In order to center the reducers and to prevent their relative free rotation, I indent the metal at 7 raising it slightly upon the opposite side to form projections 8, these being positioned so as to project into the knockout aperture or opening of the side wall of the casing. When tightening up the parts the projections 8 of the complemental reducers will center the washers and also, by their engagement with each other, they are prevented from relative free rotation.

In assembling the device shown, one of the washers 4 is held alongside the aperture in the casing wall and the conduit 2 with nut 3 threaded thereon is thrust through the aperture 5 in the washer 4. The plurality of projections 7, 8, on this washer enter into the aperture in the casing wall and, as is obvious, coöperate with the thin edge of the apertured wall at a plurality of points thereby retaining the conduit in the center of the aperture of the wall. When in this position the other washer with its plurality of projections 7, 8, turned toward the first washer is slipped over the end of the conduit and down to the casing wall. Now the projections on this washer may enter the aperture in the casing wall occupying an angular position somewhat different from the projections on the other washer. This second washer with its projections, of course, will coöperate with the edge of the aperture in the casing as do the projections on the first washer. When, however, the bushing 6 is tightened onto the end of the conduit it will firmly engage the upper plate 4 and draw the nut 3 into engagement with the lower plate 4. On drawing the bushing up to give a tight and secure fit one washer may rotate relative to the other until the projections abut and, besides assisting in alinement of the conduit and aperture in the wall, will provide a substantially flat surface for engagement with the face of the bushing 6 and nut 3.

Figure 3:
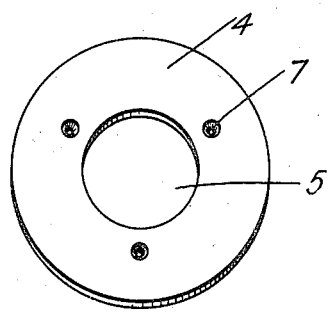
Fig. 3 is a view in perspective of one of the reducers.
Figure 4:
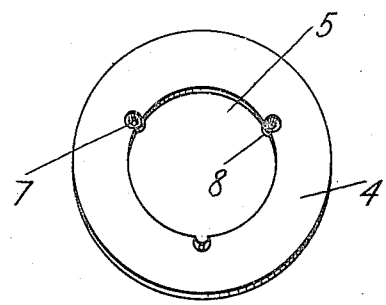
Fig. 4 is a similar view of another of the reducers, but larger in size.

In Fig. 3 I have illustrated a reducer plate having a still smaller aperture intended for use in connection with a conduit of a still smaller diameter. In this case the indentations 7 will be made at a point a trifle more remote from the inner circumferential edge of the aperture so as to be in proximity to the interior edge of the aperture of the casing in which the conduit is mounted.

Having thus described my invention, what I claim as new herein and desire to secure by Letters Patent is:—

1. In combination with a metal casing provided with an aperture, a conduit of less diameter than said aperture, a pair of reducers provided with apertures of less diameter than the aperture of the casing and arranged on opposite sides of said casing, means formed integral with said reducers for preventing lateral and relative movement thereof, and means carried by said conduit and coöperating with said reducers for clamping said conduit within the aperture of the casing.

2. In combination with a metal casing provided with an aperture, a pair of reducers of sufficient diameter to extend over and beyond the aperture of the casing, said reducers being provided with apertures of less diameter than the aperture of the casing, said reducers having a plurality of punched out projections formed near the inner circumferential edge thereof, a conduit approximating the diameter of the aperture of the reducers mounted in and extending through the casing, said reducers being positioned upon said conduit so that the projections thereon oppose each other, and a pair of binding nuts in screw-threaded engagement with said conduit and arranged to bear against said reducers to clamp the casing between them.

3. The combination of two apertured reducing plates adapted to coöperate with the edge of an apertured switch casing, and having a plurality of centering projections adapted to coöperate with one another.

4. In the combination with a metal casing provided with an aperture, of a conduit of less diameter than said aperture, a pair of reducers provided with apertures and arranged on opposite sides of said casing, means formed integral with the reducers for preventing lateral and relative movement thereof, and means for securing said reducers and conduit in place.

5. In the combination with a metal casing provided with an aperture, of a pair of reducers disposed on either side of said casing and having apertures of less diameter than the aperture in said casing, a conduit extending through the apertures of said reducers and casing, means integral with said reducers clearing one another and coöperating with one another to anchor said reducers against movement relative to one another, and means for securing said reducers and conduit in place.

6. In the combination with a metal casing provided with an aperture, of a pair of reducers disposed on either side of said casing and having apertures of less diameter than the aperture in said casing, a conduit extending through the apertures of said reducers and casing, means integral with each reducer clearing one another and coöperating with one another to center said reducers relative to the aperture in said casing and anchor said reducers against movement relative to one another, and means for securing said reducers and conduit in place.

BRYSON DEXTER HORTON.